No. 714,757. Patented Dec. 2, 1902.
J. STRAKELE.
LIFE SAVING APPARATUS.
(Application filed Aug. 4, 1902.)
(No Model.)

Witnesses:
E. B. Bolton
Ira W. Aldous

Inventor
John Strakele
By his Attorney.

THE NORRIS PETERS CO., PHOTO-LITHO., WASHINGTON, D. C.

UNITED STATES PATENT OFFICE.

...RAKELE, OF NEW YORK, N. Y., ASSIGNOR OF ONE-THIRD TO JOHANN MARTIN SCHWENK, OF NEW YORK, N. Y.

LIFE-SAVING APPARATUS.

...IFICATION forming part of Letters Patent No. 714,757, dated December 2, 1902.

Application filed August 4, 1902. Serial No. 118,283. (No model.)

Figure 1:
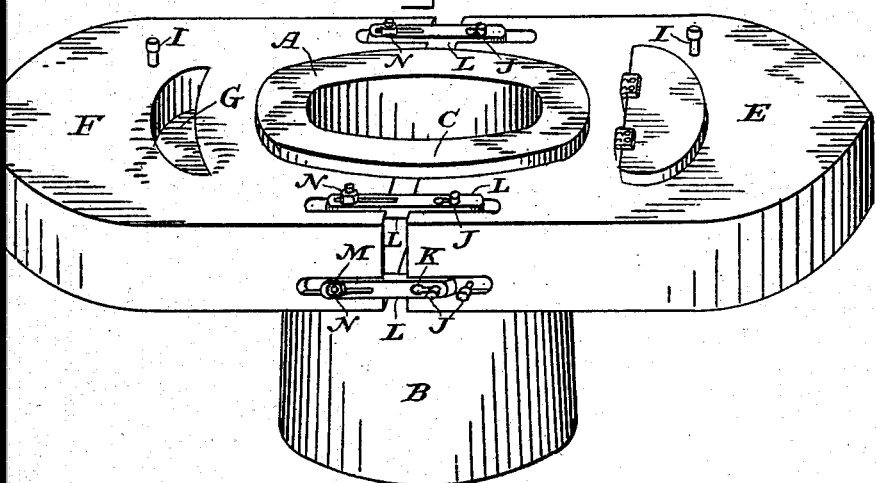
Figure 3:
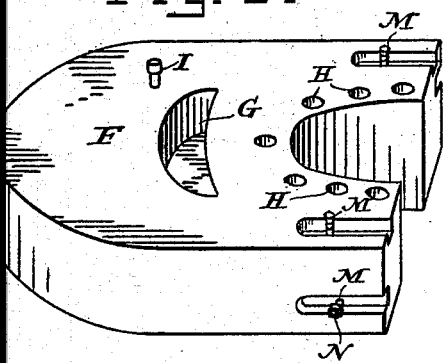
Figure 2:
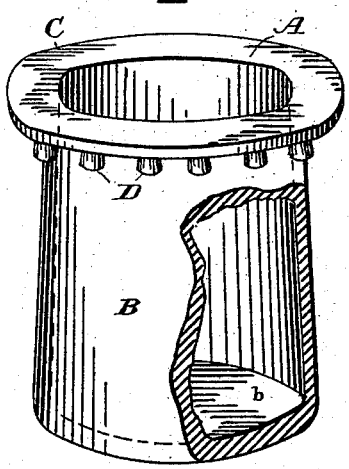
Figure 4:
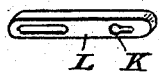

...om it may concern:
...wn that I, JOHN STRAKELE, a sub-
...Emperor of Austria-Hungary, and
...f the borough of Manhattan, city,
...State of New York, have invented
...and useful Improvements in Life-
...paratus, of which the following is
...r, and exact specification.
...tion relates to life-saving appa-
...has for its object to provide a de-
...kind with as few parts as possi-
...nsive to construct, and effectual ...ratus includes, essentially, a cen-
...rtment to receive the body of the
...g an overhanging flange with de-
...ns and two inflatable sections de-
...about said compartment provided
...ngs adapted to be registered with
...e said pins and with additional
...securing the same about said com- ...ntion further includes the parts,
...n of parts, and details of construc-
...ereinafter described, and particu-
...ed out in the claims.
...bing my invention I will refer to
...anying drawings, wherein like let-
...rence refer to like parts through-
...eral views.
...is a perspective view of the entire
...ig. 2 is a side perspective view of
...for the lower limbs. Fig. 3 is a
...view of one part of the float, and
...detail perspective view of a sliding
...for adjusting the floats.
...sed in the accompanying drawings,
...compartment or casing, which is
...y the letter B, is tubular in form,
...d bottom $b$, and is provided with
...ging annular flange C at the upper
...vertical wall. From the under
...flange a plurality of equidistant-
...el-pins D depend.
...which when inflated is preferably
...d consists of two parts E F, each
...ining a pocket G for the reception
...of food, drink, &c. Each part or
...he float is curved or dished at its
...o conform to the periphery of the
...partment or casing, about which the same are intended to snugly fit. On the upper part of each float near its inner edge is a series of openings or holes H, into which the dowel-pins D engage. Each float is provided with a valve-controlled opening I, into which an air-pump for injecting air into the floats may be inserted.

On the exterior of each side of the float E is a series of studs J with enlarged heads, which are adapted to engage with openings K in a sliding piece L on the float F. The sliding pieces L are mortised a part of their length and the pieces M, secured to the float F, pass through the mortise, retain the sliding pieces, and permit of their having a sliding motion for a predetermined distance. A nut N is provided to clamp the sliding piece and prevent its moving after it has once been adjusted.

The floats E and F are made of any waterproof material, preferably caoutchouc, and I have found that the best results may be obtained from the device if it is made boat-shaped. The casing B may be in either one piece, as shown in the drawings, or, if desired, may be divided and in the form of trousers.

The operation of the life-saving apparatus is as follows: The user places the lower portion of his body in the casing B, and the sections E T having been inflated are clamped about said casing, the dowel-pins D being forced into the openings H. The sections are tightened about the casing, as may be necessary, and properly secured through the medium of the pins J being passed into the openings K of the sliding pieces L. An arrangement similar to this is secured on the top of the float to more securely hold the two parts of the float together.

By deflating the floats E and F the entire apparatus may be folded into a small compass and a large quantity of the life-savers may be stacked under bunkers or in other places where they will not be in the way.

Having now described my invention, what I claim as new, and desire to secure by Letters Patent, is—

1. In an apparatus of the class described, a central casing having an overhanging annular flange, dowel-pins depending from the latter, and inflatable sections having openings to receive said pins, substantially as described.

2. In an apparatus of the class described, a central compartment having an overhanging flange, pins depending therefrom, and inflatable sections having inner portions curved to fit against said central casing, and openings designed to receive said depending pins, substantially as described.

3. In an apparatus of the class described, a central section having an annular flange, pins depending therefrom, inflatable sections designed to fit about said casing and provided with openings to receive said pins, and means for securing said sections together, substantially as described.

4. In a life-saving apparatus the combination of a two-part float, each part being provided near its inner edge with openings, a casing having a flange and dowel-pins depending from said flange, said dowel-pins being adapted to engage in the openings in the floats and secure the floats and the casing together substantially as described.

5. In a life-saving apparatus the combination of a two-part float, a casing adapted to be secured to the float and means for holding the two parts of the float together, said means comprising a series of studs on one of the parts and a sliding piece with apertures into which the studs engage on the other part, substantially as described.

6. In a life-saving apparatus the combination of a two-part float, a casing having an annular flange, dowel-pins depending therefrom, said pins engaging into openings in the float, a series of studs on one part of the float and a sliding piece provided with holes on the other part of the float, the studs passing into the holes of the sliding pieces to retain the parts of the float together substantially as described.

In witness whereof I have hereunto set my hand in presence of two witnesses.

JOHN STRAKELE.

Witnesses:
R. WINTERNIT,
OTTO MUNK.